US009464743B2

(12) United States Patent
Schutte et al.

(10) Patent No.: US 9,464,743 B2

(45) Date of Patent: Oct. 11, 2016

(54) BIAS RELEASE CARTRIDGE

(75) Inventors: Joseph P. Schutte, Westland, MI (US); William Franklin Turnau, III, Canton, MI (US); Brian D. Sanzone, Commerce Township, MI (US); Derry Yourman, Canton, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 1328 days.

(21) Appl. No.: 12/603,121

(22) Filed: Oct. 21, 2009

(65) Prior Publication Data

US 2011/0088790 A1 Apr. 21, 2011

(51) Int. Cl.
*F16L 37/08* (2006.01)

(52) U.S. Cl.
CPC ........ *F16L 37/0915* (2016.05); *F16L 2201/20* (2013.01); *Y10T 137/6011* (2015.04); *Y10T 137/6109* (2015.04)

(58) Field of Classification Search
USPC ....... 251/148, 149.1–149.9, 151; 285/24, 33, 285/80, 81, 305, 314, 315, 325, 330, 332, 285/339, 345, 346, 347; 137/15.09, 383
See application file for complete search history.

(56) References Cited

U.S. PATENT DOCUMENTS 1,440,207 A 12/1922 Burns
2,479,960 A * 8/1949 Osborn ........................ 285/104
3,131,905 A * 5/1964 Nyberg ...................... 251/149.6
3,334,661 A 8/1967 Milette
3,429,596 A 2/1969 Marshall
3,776,260 A * 12/1973 Ruddick ....................... 137/321
4,049,014 A * 9/1977 Johnson .................. 137/315.11
4,336,824 A * 6/1982 Steineman ............... 137/315.11
4,613,112 A 9/1986 Phlipot et al.
4,632,437 A 12/1986 Robson et al.
4,717,048 A * 1/1988 Stenger ...................... 222/400.8
4,749,214 A * 6/1988 Hoskins et al. ................. 285/4
5,090,599 A * 2/1992 Stenger ...................... 222/400.7
5,275,443 A * 1/1994 Klinger .......................... 285/82
5,405,175 A 4/1995 Bonnah et al.
5,695,223 A * 12/1997 Boticki .......................... 285/23
5,727,821 A * 3/1998 Miller ........................... 285/318
5,803,513 A 9/1998 Richardson
5,964,483 A * 10/1999 Long et al. .................. 285/305
5,971,019 A 10/1999 Imai (Continued)

FOREIGN PATENT DOCUMENTS

CN 1167889 12/1997
CN 1333865 1/2002

(Continued)

OTHER PUBLICATIONS

U.S. Appl. No. 12/603,161 entitled "Supply Stop With Connection Verification".

(Continued)

*Primary Examiner* — Matthew W Jellett

(74) *Attorney, Agent, or Firm* — Carlson, Gaskey & Olds, PC

(57) ABSTRACT

An apparatus for unsealing a pipe in a pipe assembly is disclosed. The apparatus has a seal for minimizing leakage from the pipe and a spring attaching to both the seal and the pipe assembly. If the seal is to be removed, a spring force of the spring acts against and moves the seal for removal of the seal.

13 Claims, 3 Drawing Sheets

(56) References Cited

U.S. PATENT DOCUMENTS

RE36,630 E 3/2000 Davey
6,173,999 B1 1/2001 Guest
6,293,596 B1 9/2001 Kinder
6,328,344 B1 12/2001 Tozaki et al.
6,386,596 B1 * 5/2002 Olson .......................... 285/321
6,450,550 B1 * 9/2002 Cornwell ..................... 285/340
6,637,779 B2 10/2003 Andre
6,702,335 B2 3/2004 Bahner et al.
6,749,358 B2 * 6/2004 Balsells ....................... 403/316
6,860,523 B2 3/2005 O'Neill et al.
6,893,051 B1 5/2005 Park et al.
6,905,143 B2 6/2005 Klinger et al.
7,014,220 B2 3/2006 Szabo et al.
7,029,036 B2 4/2006 Andre
7,121,592 B2 10/2006 Sazbo et al.
7,128,347 B2 10/2006 Kerin
7,232,159 B2 6/2007 O'Neill et al.
7,300,076 B2 11/2007 Inoue
7,314,209 B2 1/2008 Pierson
7,338,030 B2 3/2008 Brown, III
7,390,025 B2 6/2008 Pepe et al.
7,396,053 B2 7/2008 Webb et al.
7,419,190 B1 9/2008 Atkinson et al.
7,434,846 B2 10/2008 Baumgartner
7,445,249 B2 11/2008 Feger et al.
7,455,330 B2 11/2008 Baumgartner
7,464,970 B2 12/2008 Yamada et al.
7,469,880 B2 12/2008 Green et al.
7,469,936 B2 12/2008 Norman
7,497,480 B2 3/2009 Kerin et al.
7,523,966 B2 4/2009 O'Neill et al.
7,527,303 B2 5/2009 Furuya
7,530,605 B2 5/2009 Rigollet et al.
7,644,958 B2 1/2010 Postler
7,651,138 B2 1/2010 Feger et al.
7,686,349 B2 3/2010 Guest
7,726,700 B2 6/2010 Norman
7,810,850 B2 10/2010 O'Neill et al.
7,823,930 B2 11/2010 Feger et al.
7,841,630 B1 11/2010 Auray et al.
8,113,547 B2 * 2/2012 Andre .......................... 285/319
2003/0217571 A1 * 11/2003 Turnau et al. .................. 70/175
2004/0021120 A1 * 2/2004 Turnau, III et al. .......... 251/309
2006/0208213 A1 * 9/2006 Turnau et al. ................ 251/309
2007/0075542 A1 4/2007 Glaze et al.
2007/0241562 A1 10/2007 O'Neill et al.
2008/0061550 A1 * 3/2008 Brosius et al. ............... 285/249
2008/0216910 A1 * 9/2008 Turnau et al. .................. 138/89
2008/0238088 A1 10/2008 Webb
2008/0238096 A1 10/2008 Kees et al.
2009/0001712 A1 1/2009 Webb et al.
2009/0026758 A1 * 1/2009 Sanzone ......................... 285/93
2009/0160185 A1 * 6/2009 Learmont et al. ............ 285/305
2009/0194990 A1 8/2009 Williams
2009/0243288 A1 10/2009 O'Neill et al.
2010/0171308 A1 * 7/2010 Sanzone et al. .............. 285/379

FOREIGN PATENT DOCUMENTS

EP 0528079 A1 2/1993
EP 0745801 A1 12/1996
EP 0794378 10/1997
GB 658366 10/1951
JP WO2005/106311 A1 11/2005
WO WO 03/089827 10/2003
WO 2011049860 A1 4/2011

OTHER PUBLICATIONS

U.S. Appl. No. 12/603,121entitled "Bias Release Cartridge".
Search Report and Written Opinion mailed on Jan. 14, 2011 for PCT/US2010/052999.
Search Report and Written Opinion mailed on Jan. 24, 2011 for PCT/US2010/053004.
Search Report and Written Opinion mailed on Feb. 8, 2011 for PCT/US2010/053029.
Notification Concerning Transmittal of International Preliminary Report on Patentability from corresponding PCT/US2010/053029 (WO 2011/049860, published Apr. 28, 2011) mailed Apr. 24, 2012.

* cited by examiner

BIAS RELEASE CARTRIDGE

Cross reference is made to copending U.S. patent application Ser. No. 12/603,161 entitled "SUPPLY STOP WITH CONNECTION VERIFICATION"; and Ser. No. 12/603,142 entitled "ANTI-ROTATION GRIPPER RING".

BACKGROUND

Snap-fit or quick connectors are employed in a wide range of applications including automotive and industrial applications, among others. Such quick connectors utilize retainers or locking elements for securing one connector component, such as a tubular conduit, within a complimentary bore of another connector component or body. These retainers are typically of the axially-displaceable or radially-displaceable type. The terms "axially-displaceable" or "radially-displaceable" are taken relative to the axial bore through a female component.

In a typical quick connector with an axially displaceable retainer, the retainer is mounted within a bore in a body of one connector component. The retainer has a plurality of radially and angularly extending legs that extend inwardly toward the axial center line of the bore in the body. A tube to be sealingly mounted in the bore in one component includes an outwardly extending portion or a flange that abuts an inner peripheral surface of the retainer legs. Seal and spacer members as well as a bearing or top hat are typically mounted in the bore ahead of the retainer to form a seal between the body and the component if the component is lockingly engaged with the retainer legs in the body.

Radially displaceable retainers are also known in which the retainer is radially displaceable through aligned bores or apertures formed transversely to the main through bore in the body. The radially displaceable retainer is typically provided with a pair of depending legs that are sized and positioned to slip behind the outwardly extending portion or flange on the tube only when the tube is fully seated in the bore in the body. This ensures a positive locking engagement of the tube with the body as well as providing an indication that the tube is fully seated since the radially displaceable retainer can be fully inserted into the body only when the tube has been fully inserted into the bore in the body.

Other quick connectors utilize retainers designed to lockingly engage beadless endforms. One type of such retainers forms an annular clip with a plurality of radially inward extending, flexible fingers, that engage the endform at an angle to resist pullout of the endform from the connector body. Another type has a radially inward projection which engages a recess in the endform.

SUMMARY OF THE INVENTION

According to a non-limiting embodiment disclosed herein, an apparatus for unsealing a pipe in a pipe assembly includes a seal for minimizing leakage from the pipe, and a spring for attaching to the seal and the pipe assembly such that if the seal is to be removed, a spring force of the spring acts against and moves the seal for removal thereof.

According to a further non-limiting embodiment disclosed herein, an apparatus for unsealing a pipe in a pipe assembly includes a holder for holding the pipe, a seal disposed in the holder for minimizing leakage from the pipe assembly, and a spring disposed between the seal and the holder such that if the pipe is to be removed from the holder, a spring force of the spring acts against and moves the seal for removal of the seal.

DESCRIPTION

Figures 1, 2, 2A:
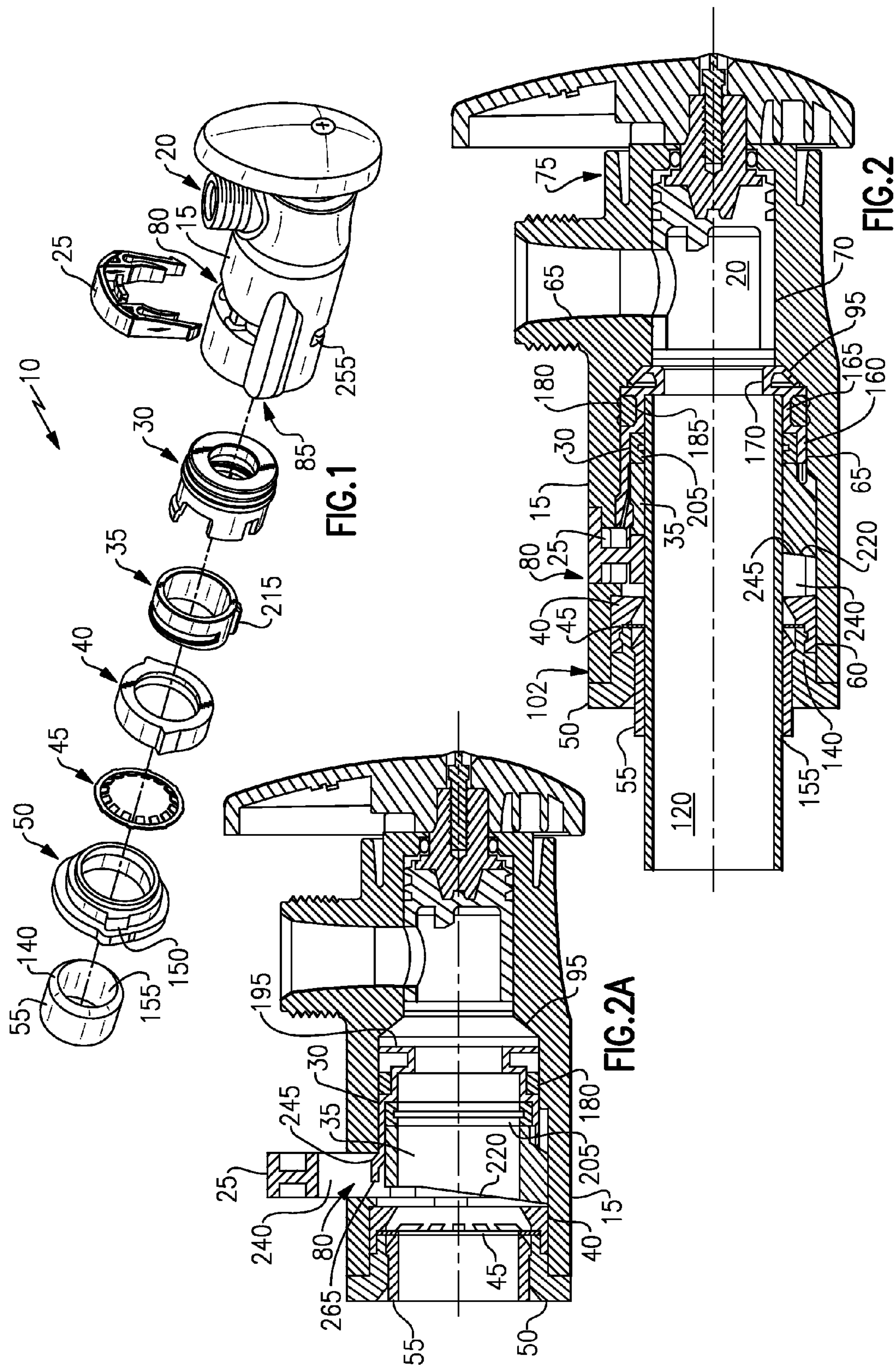
FIG. 1 is a perspective, disassembled view of an embodiment of a supply stop.
FIG. 2 is an assembled, cutaway view of the supply stop of FIG. 1 in an installed position.
FIG. 2A is a, cutaway view of the supply stop of FIG. 2 in an un-installed position.

Referring to FIGS. 1 and 2, a non-limiting embodiment of a supply stop 10 is shown. The embodiment has a body 15, a valve portion 20, a verification clip 25, a verification cartridge 30, a compression ring 35, a backer ring 40, a gripper ring 45, a retainer 50 and a collet 55.

Figure 8:
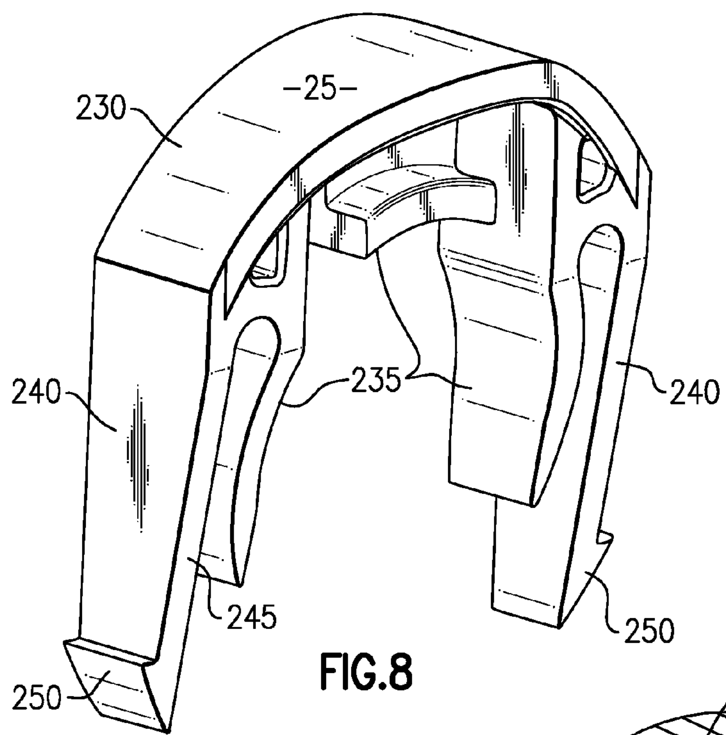
FIG. 8 is a perspective view of a verification clip of FIG. 1.
Figure 8A:
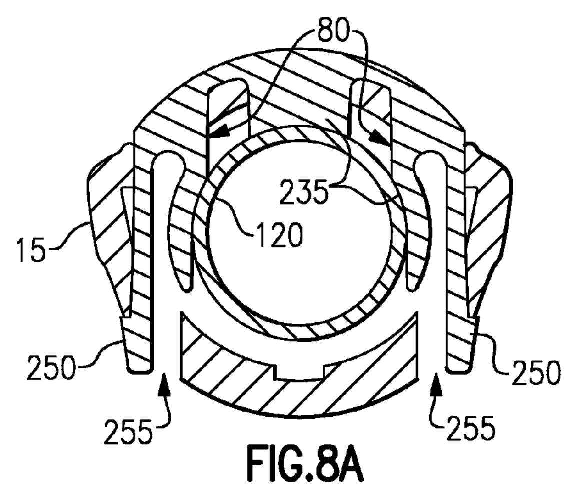
FIG. 8A is an end schematic view of an assembled verification clip seated in a body of FIG. 1.

A body 15 has as a main inlet bore 60, an outlet bore 65, a minor bore 70 in which the valve portion 20 is disposed, and a handle assembly 75. The body further has a semi-circular opening 80 (see also FIG. 8A) in which the verification clip 25 may be inserted as will be discussed herein. The body 15 also has a pair of outboard openings 85 (see also FIG. 5) extending from the main bore 60 into which ears 90 extending from the backer ring 40 are inserted (see also FIG. 5) as will be discussed herein below.

The body 15 has a chamfered surface 95 that extends from the main bore 60 to the minor bore 70 to form an interference fit with the verification cartridge 30 as will also be discussed herein below.

Referring to FIGS. 2-5, the collet 55, the retainer 50 and gripper ring 45, the backer ring 40 form an assembly 100 in the body 15.

Figure 3:
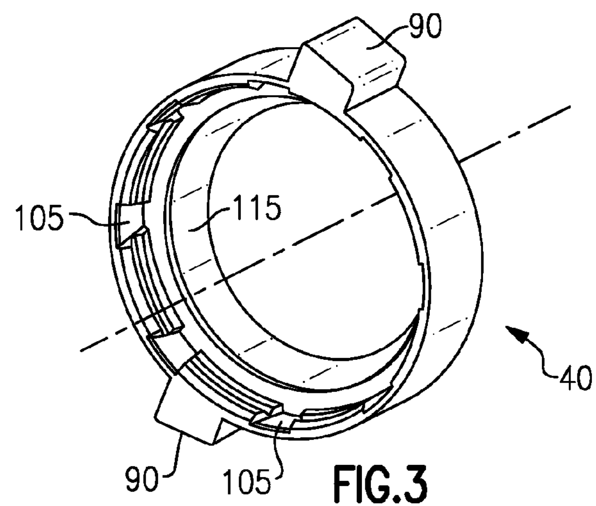
FIG. 3 is a perspective view of a retainer of FIG. 1.

In FIG. 3, the backer ring 40 is shown having a plurality of indentations 105 and an inner wall 110 backing the indentations depending inwardly therefrom, and a flange 115. The flange 115 has approximately the same inner diameter as a pipe 120 (see FIGS. 2 and 5) that might be passed therethrough to provide fluid through the inlet bore 60 to the valve portion 20. An outer surface 125 of the backer ring 40 has a pair of ears 90 that fit into a pair of outboard openings 85 (see also FIG. 5) in the body 15.

Figure 4:
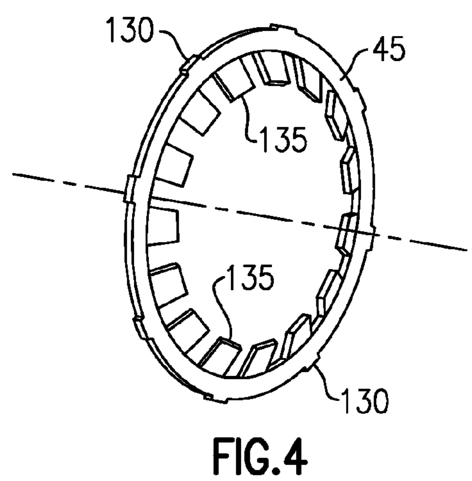
FIG. 4 is a perspective view of a gripper ring of FIG. 1.

As shown in FIG. 4, the gripper ring 45 has a plurality of outwardly depending fingers 130 that mate with the indentations 105 in the backer ring 40. The gripper ring 45 also has a plurality of teeth 135 that extend within the inner bore 60 of the body 15 through which the pipe 120 extends and form an interference fit with the pipe when the pipe is inserted through the gripper ring 45. The teeth 135 extend in the direction the pipe 120 is inserted into the body 15 so that attempts to remove the pipe from within the body are opposed by the teeth 130 that dig into the pipe 120 during such an attempt. The teeth 130 also oppose rotation of the gripper ring 45 about the pipe 120.

Figure 5:
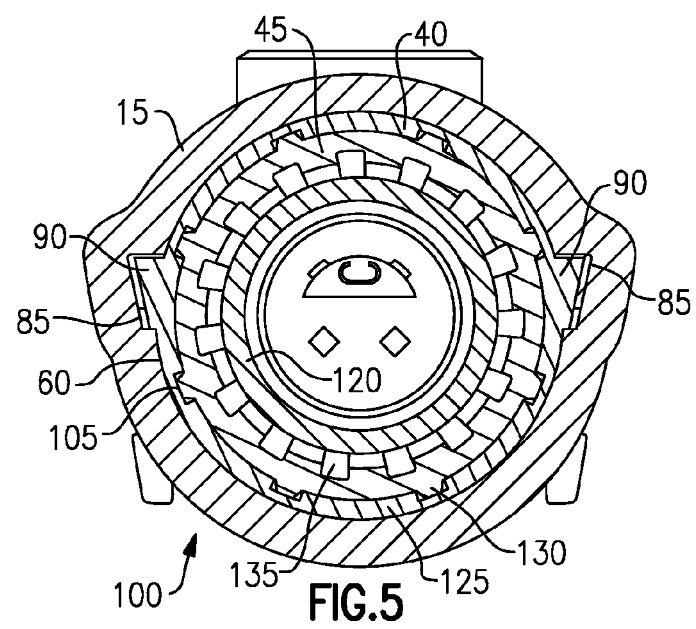
FIG. 5 is a perspective, end view of an assembled retainer, gripper ring and body of FIG. 1.

As shown in FIG. 5, the ears 90 of the backer ring 40 are inserted into the outboard openings 85 in the body 15 thereby preventing the backer ring 40 from any rotation therein. Further, the outwardly extending fingers 130 of the gripper ring 45 fit within the indentations 105 in the backer ring 40 thereby preventing the gripper ring 45 from rotating within the backer ring 40.

Referring to FIGS. 2 and 2A, after insertion of the gripper ring 45 into the backer ring 40, retainer 50 and the backer ring 40 are mated together, and the collet 55 is inserted into the retainer 50. An outward extension 140 of the collet 55 gets hung up on an interior shoulder of the retainer 50. The retainer 50, similar to the backer ring 40, has a pair of ears 150 for insertion into the outboard openings 85 in the body 15 to seal the body and prevent leakage therefrom. The retainer 50 also serves to hold the gripper ring 45 within the extension 105 in the backer ring 40. The collet 55, the retainer 50, and the backer ring 40 in the body 15, may be constructed of a similar material, such as a plastic or polymer, that may be sonically welded together. A sonic weld provides a strong bond and helps minimize leaks through the end of the body 15. The collet 55 has an inner diameter 155 that approximates the diameter of the pipe 120 through the collet and assist in guiding the pipe into the body for positive retainment therein.

Figure 6:
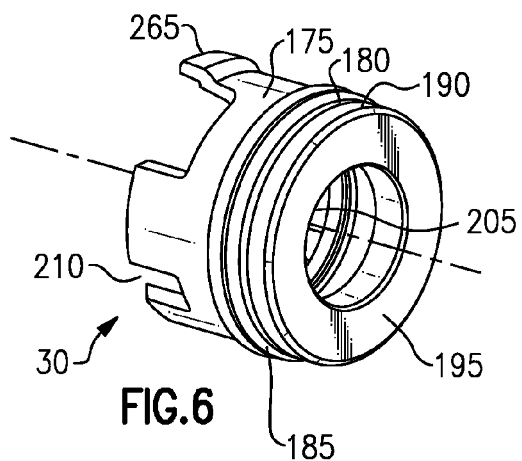
FIG. 6 is a perspective view of a verification cartridge of FIG. 1.
Figure 7:
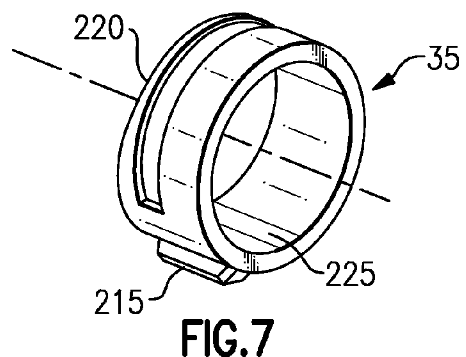
FIG. 7 is a perspective view of a compression ring of FIG. 1.

Referring now to FIGS. 2 and 6, verification cartridge 30 is shown. The verification cartridge 30 has a first interior diameter 160, a second interior diameter 165 and a third interior diameter 170. The first interior diameter 160 is designed to hold the compression ring 35, the second interior diameter 165 is designed to hold an end of the pipe 120 to be inserted therein, and the third interior diameter 170 forms a passageway through which fluid flows to the valve portion 20. An outer surface 175 of the verification cartridge 30 includes a first sealing element 180 that may be disposed in a groove 185 disposed outside the second interior diameter 165. A second groove 190 defines an exterior flange 195 that interacts with the chamfered surface 95 of the body 15 body of the valve portion, as will be discussed herein below. The first interior diameter 160 has a second seal 205 disposed thereon a juncture between the second interior diameter 165 and the first interior diameter 160. Interference tab 265 helps prevent insertion of verification clip 25 if the verification cartridge 30 and compression ring 35 are not properly in position as will be discussed herein below.

The first and second seals 180, 205 disposed in the verification cartridge 30 may be co-injection molded with the body of the verification cartridge 30. The verification cartridge 30 is designed to have an interference fit within the body 15 so that seal 180 minimizes leakage from the valve portion 20 back towards the retainer 50. The seal 205 is not designed to have an interference fit initially with the pipe 120 that passes therethrough, as will be discussed herein. The verification cartridge 30 has a groove 210 therein for receiving a position tab within the compression ring 35, as will be discussed herein.

Referring now to FIGS. 1, 2, 2A and 7, the compression ring 35 has a location tab 215 cooperating with the groove 210 of the verification cartridge. The compression ring has a chamfered surface 220 that cooperates with the verification clip 25, as will be discussed herein. The compression ring also has an interior bore 225 through which a pipe extends therethrough.

Referring now to FIGS. 1, 2, 8 and 8A, the verification clip 25 and its relationship to the body 15 of the supply stop 10 is shown. The verification clip 25 has an upper arcuate portion 230 that conforms to the shape of the exterior of the body 15 if inserted therein, a plurality of arcuate engagement members 235 for engaging the pipe 120, and two legs 240. Each leg is flexible, has an angled side 245 that is designed to engage the chamfered surface 220 of the compression ring 35 to move axially towards the verification cartridge 30 and a pair of snap tabs 250 at the ends of the legs. Each of the snap tabs 250 is designed to fit within openings 255 in the body 15. The flexibility of each of the legs 240 causes the legs to create a signal such as an audible click to be heard when the snap tabs 250 are released to extend beyond the body 15 when encountering opening 255 after being flexed inwardly to be inserted into the body 15.

Referring to FIG. 2A, to assemble the supply stop 10, the verification cartridge 30 is inserted into the body 15 before the compression ring 35. The fingers 130 of the gripper ring 45 are then inserted into the indentations 105 of the backer ring 40 so that the gripper ring does not rotate within the backer ring. The ears 90 of the backer ring 40 are inserted into the outboard openings 85 of the body 15 so that the backer ring and the gripper ring inserted in the backer ring do not rotate within the body. The collet is inserted into the retainer. Then the collet and retainer are inserted into the body 15. The collet 55, the retainer 50, the gripper ring 45, the backer ring 40 are all then sonically welded (or glued or the like) together and to the body 15. The verification cartridge 30 and the compression ring 35 are still free to move axially within the body 15. Note that exterior flange 195 is unbent and does not contact the chamfered surface 95 of the body 15. Note also that verification clip 25 is blocked from insertion into opening 80 by interference tab 265 on the verification cartridge 30 and by compression ring 35. The angled surface 245 of the legs 240 of the verification clip 25 do not reach the chamfered surface 220 of the compression ring 35 to move the compression ring towards the valve portion 20.

Referring now to FIG. 2, a pipe 120 is inserted into the body 15 through the collet 55, the compression ring 35 and the verification cartridge 30. While being inserted, an end 260 of the pipe 120 enters the second portion 165 of a reduced diameter within the verification cartridge and pushes the verification cartridge towards the valve portion 20 such that the exterior flange 195 of the verification cartridge 30 engages the chamfered surface 95 of the body 15 and bends backwardly towards the compression ring 35. The compression ring 35 is disposed at this time within the verification cartridge 30.

Because the interference tab 265 and the compression ring 35 are moved axially by insertion of the pipe 120, a user may then insert the verification clip 25 within the opening 80 within the body 15. The angled surfaces 245 of the legs 240 then have access to and engage the chamfered surface 220 of the compression ring 35, the surfaces cooperating thereby to drive the compression ring axially towards the valve portion 20. As the compression rings moves, the inner seal 205 of the verification cartridge is compressed by contact with the compression ring and the inner seal then makes contact with the pipe 120 providing sealing thereby. As the verification clip continues to move, its legs 240 extend beyond the body 15 through opening 255 and an audible click may be heard signaling to a user that installation is complete.

If the verification clip 25 is not fully inserted, the compression ring 35 will not compress the inner seal 215 properly and leakage will be detected if the water is turned on. Furthermore, if the compression ring 35 does not move far enough axially, because the pipe 120 is not inserted far enough, the legs 240 of the verification clip 25 will not move far enough in cooperation with the chamfered surface 220 of the compression ring 35 to provide an audible click.

The integrally formed exterior flange 195 of the verification cartridge 30 provides two functions. First, if the pipe 120 is not inserted far enough into the body 15 (or not at all), the exterior flange 195 is flexible (e.g., spring-like) enough so that it pushes the verification cartridge 30, and the compression ring 35 thereby, back towards the backer ring 40 thereby minimizing a probability that a user can insert the verification clip 25 far enough into the body 25 to believe the pipe 120 is properly installed. Secondly, if the supply stop has to be removed, reused or adjusted, after the verification clip is removed, the flexible exterior flange interacts as a spring with the chamfered surface 95 of the body to push the verification cartridge 30 and compression ring 35 and first and second seals 180, 205 back towards the backer ring 40 so they can be accessed, adjusted or reused.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. An apparatus for unsealing a pipe in a pipe assembly, said apparatus comprising:

a holder defining a bore for receiving a pipe, a seal disposed in said bore for minimizing leakage from said holder, a verification cartridge disposed in said bore, and a verification clip that cooperates with said verification cartridge to seal the pipe within the holder such that when said verification clip and said pipe are removed from said holder, a spring force of said verification cartridge acts against an inner surface of said bore and moves each portion of said seal from a sealed position within said bore to an unsealed position within said bore for removal of said seal from said bore, and wherein said spring force is aligned with a longitudinal axis of said pipe.

2. The apparatus of claim 1, wherein said spring further comprises:

a flexible flange disposed upon said verification cartridge, said flexible flange compressing against said inner surface of said bore if a force is applied to said spring when said flange is adjacent to said inner surface and decompresses if said force is removed therefrom.

3. The apparatus of claim 2, wherein a portion of said flexible flange is oblique to the longitudinal axis of said pipe when said pipe is sealed.

4. The apparatus of claim 1, wherein said a portion of said inner surface angles towards an exit port of said bore.

5. The apparatus of claim 1, wherein said holder is a valve.

6. The apparatus for unsealing a pipe in a pipe assembly of claim 3, wherein a portion of said inner surface is oblique to the longitudinal axis of the pipe.

7. An apparatus for unsealing a pipe in a pipe assembly, said apparatus comprising:

a holder defining a bore for receiving a pipe, at least one seal for receiving said pipe there through and minimizing leakage from said pipe within said holder, a verification cartridge whereupon said at least one seal is disposed, said verification cartridge selectively located in said bore, a verification clip that cooperates with said verification cartridge to seal the pipe within said holder, and a spring defined by said verification cartridge wherein when said at least one seal is to be removed, a spring force of said verification cartridge acts against an inner surface of said bore after removal of said verification clip from said holder and moves each portion of said at least one seal from a sealed position within said bore to an unsealed position within said bore for removal of said seal from said bore, and wherein said spring force is aligned with a longitudinal axis of said pipe.

8. The apparatus of claim 7, wherein said spring further comprises:

a flexible flange defined by said cartridge, said flange compressing against said inner surface of said bore if a force is applied to said spring when said flange is adjacent to said inner surface and decompressing if said force is removed therefrom.

9. The apparatus of claim 7, wherein a portion of said flexible flange is oblique to the longitudinal axis of said pipe when said pipe is sealed.

10. The apparatus of claim 7, wherein a portion of said surface angles towards an exit port of said bore.

11. The apparatus of claim 7, wherein said holder is a valve.

12. The apparatus for unsealing a pipe in a pipe assembly of claim 9, wherein a portion of said inner surface is oblique to the longitudinal axis of the pipe.

13. A method for removing a seal encircling a pipe from a pipe holder, said method comprising:

providing a verification cartridge whereupon at least one seal is disposed, said verification cartridge for being disposed within a bore of a pipe holder;

providing a spring integral with said verification cartridge;

removing an obstruction to said verification cartridge whereby said spring acts against an inner surface of said bore to move each portion of said at least one seal from a sealed position within said bore to an unsealed position within said bore by exerting a spring force aligned with a longitudinal axis of said pipe; and removing said verification cartridge and said at least one seal from said bore.

* * * * *

UNITED STATES PATENT AND TRADEMARK OFFICE
CERTIFICATE OF CORRECTION

PATENT NO. : 9,464,743 B2  
APPLICATION NO. : 12/603121  
DATED : October 11, 2016  
INVENTOR(S) : Joseph P. Schutte et al.

Page 1 of 1

It is certified that error appears in the above-identified patent and that said Letters Patent is hereby corrected as shown below:

In the Claims

In Claim 9, Column 6, Line 30; "claim 7" should read as --claim 8--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*